United States Patent
Salamat et al.

(10) Patent No.: US 9,854,544 B2
(45) Date of Patent: *Dec. 26, 2017

(54) POWER SPECTRAL DENSITY CONTROL USING AIS AND SPREADING IN AN AERONAUTICAL SATCOM TERMINAL USING A LOW PROFILE ANTENNA

(71) Applicant: Hughes Network Systems, LLC, Germantown, MD (US)

(72) Inventors: Bahman Salamat, Germantown, MD (US); Jack Lundstedt, Germantown, MD (US); Yezdi Antia, Germantown, MD (US); Guy Montgomery, Germantown, MD (US); John Schmid, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,248

(22) Filed: Feb. 28, 2017

(65) Prior Publication Data
US 2017/0188317 A1 Jun. 29, 2017

Related U.S. Application Data

(63) Continuation of application No. 14/982,708, filed on Dec. 29, 2015, now Pat. No. 9,621,256.

(51) Int. Cl.
| | |
|---|---|
| *H04B 7/185* | (2006.01) |
| *H04W 52/18* | (2009.01) |
| *H04W 72/04* | (2009.01) |
| *H04W 52/36* | (2009.01) |

(52) U.S. Cl.
CPC ...... *H04W 52/367* (2013.01); *H04B 7/18508* (2013.01)

(58) Field of Classification Search
CPC ......... H04B 7/00; H04B 7/185; H04W 52/04; H04W 52/18; H04W 72/04
See application file for complete search history.

(56) References Cited

U.S. PATENT DOCUMENTS

| | | | | |
|---|---|---|---|---|
| 7,054,593 | B2 * | 5/2006 | de La Chapelle | H04B 7/18506 455/12.1 |
| 7,146,179 | B2 * | 12/2006 | Parulski | H04N 1/00132 348/211.2 |
| 7,302,226 | B2 * | 11/2007 | Stephenson | H04B 7/18591 370/316 |

(Continued)

*Primary Examiner* — Blane Jackson
(74) *Attorney, Agent, or Firm* — Nath, Goldberg & Meyer; Leonid D. Thenor

(57) ABSTRACT

Power spectral density in an aeronautical satellite communication system is controlled through the use of adaptive inroute selection and spreading. Once a communication session has been established between the aircraft and the satellite, environmental conditions and aircraft conditions are monitored to detect events capable of affecting transmit/receive properties during the communication session. A maximum allowable transmission output is determined based, at least in part, on governmental regulations and the conditions being monitored. One or more transmit parameters are adjusted during the time interval in order to maintain transmission output power of the aircraft terminal below the maximum allowable transmission output power.

20 Claims, 12 Drawing Sheets

(56) References Cited

U.S. PATENT DOCUMENTS

| | | | |
|---|---|---|---|
| 9,319,466 B2* | 4/2016 | Lu | H04L 67/12 |
| 9,621,256 B1* | 4/2017 | Salamat | H04B 7/18506 |
| 2002/0058478 A1* | 5/2002 | de La Chapelle | H04B 7/18506 |
| | | | 455/13.4 |
| 2006/0035588 A1* | 2/2006 | Chapelle | H04B 7/18508 |
| | | | 455/13.3 |
| 2006/0111041 A1* | 5/2006 | Karabinis | H04B 7/216 |
| | | | 455/13.4 |
| 2007/0275659 A1* | 11/2007 | Parkman | H04B 7/18506 |
| | | | 455/13.4 |
| 2010/0311460 A1* | 12/2010 | Hofmann | H04B 7/18506 |
| | | | 455/522 |
| 2016/0119938 A1* | 4/2016 | Frerking | H04W 72/10 |
| | | | 370/316 |

* cited by examiner

| Index 510 | Spread Factor 512 | Multiplexing Type 514 | Modulation Type 516 | Symbol Rate (Ksps) 518 | Code Rate 520 | Minimum Es/No (dB) 522 | Target Es/No (dB) 524 | C/No 526 | PSD (dB/Hz) 528 |
|---|---|---|---|---|---|---|---|---|---|
| 1 | 1 | TDMA | OQPSK | 2048 | 9/10 | 8.32 | 9.02 | 41.43 | 9.02 |
| 2 | 1 | TDMA | OQPSK | 2048 | 4/5 | 6.32 | 7.02 | 39.43 | 7.02 |
| 3 | 1 | TDMA | OQPSK | 2048 | 2/3 | 4.48 | 5.18 | 37.59 | 5.18 |
| 4 | 1 | TDMA | OQPSK | 2048 | 1/2 | 3.17 | 3.87 | 36.28 | 3.87 |
| 5 | 1 | TDMA | OQPSK | 1024 | 9/10 | 8.32 | 9.02 | 38.42 | 9.02 |
| 6 | 2 | TDMA | OQPSK | 1024 | 9/10 | 8.32 | 9.02 | 38.42 | 6.01 |
| 7 | 1 | TDMA | OQPSK | 1024 | 4/5 | 6.32 | 7.02 | 36.42 | 7.02 |
| 8 | 2 | TDMA | OQPSK | 1024 | 4/5 | 6.32 | 7.02 | 36.42 | 4.01 |
| 9 | 1 | TDMA | OQPSK | 1024 | 2/3 | 4.48 | 5.18 | 34.58 | 5.18 |
| 10 | 2 | TDMA | OQPSK | 1024 | 2/3 | 4.48 | 5.18 | 34.58 | 2.17 |
| 11 | 1 | TDMA | OQPSK | 1024 | 1/2 | 3.17 | 3.87 | 33.27 | 3.87 |
| 12 | 2 | TDMA | OQPSK | 1024 | 1/2 | 3.17 | 3.87 | 33.27 | 0.86 |
| 13 | 1 | TDMA | OQPSK | 512 | 9/10 | 8.32 | 9.02 | 35.41 | 9.02 |
| 14 | 4 | TDMA | OQPSK | 512 | 9/10 | 8.32 | 9.02 | 35.41 | 3 |
| 15 | 1 | TDMA | OQPSK | 512 | 4/5 | 6.32 | 7.02 | 33.41 | 7.02 |
| 16 | 4 | TDMA | OQPSK | 512 | 4/5 | 6.32 | 7.02 | 33.41 | 1 |
| 17 | 1 | TDMA | OQPSK | 512 | 2/3 | 4.48 | 5.18 | 31.57 | 5.18 |
| 18 | 4 | TDMA | OQPSK | 512 | 2/3 | 4.48 | 5.18 | 31.57 | -0.84 |
| 19 | 1 | TDMA | OQPSK | 512 | 1/2 | 3.17 | 3.87 | 30.26 | 3.87 |
| 20 | 4 | TDMA | OQPSK | 512 | 1/2 | 3.17 | 3.87 | 30.26 | -2.15 |

Fig. 5

POWER SPECTRAL DENSITY CONTROL USING AIS AND SPREADING IN AN AERONAUTICAL SATCOM TERMINAL USING A LOW PROFILE ANTENNA

CROSS REFERENCE TO RELATED APPLICATIONS

The present application is a continuation of U.S. patent application Ser. No. 14/982,708 filed Dec. 29, 2015 and entitled "Power Spectral Density Control Using AIS and Spreading in an Aeronautical Satcom Terminal Using a Low Profile Antenna," the entire contents of which are incorporated herein by reference.

BACKGROUND INFORMATION

Developments in mobile communications have enabled consumers to remain connected without the need to have a wired connection. For example, satellite communication systems allow consumers to access voice and data services from virtually any global location. Such accessibility can be beneficial for consumers who are located in, or must travel to, areas that cannot be serviced by normal communication systems. Service providers of voice and communication networks are faced with requests for seemingly endless levels of bandwidth by consumers and content providers. Consumers utilize devices such as mobile phones, tablets, computers, etc. to obtain various types of content which can often require greater bandwidth and a higher quality of service than only a short period of time prior.

Satellite communication systems have introduced an added level of mobility wherein consumers are capable of remaining connected on mobile platforms such as aircrafts. Satellite communication systems that facilitate aeronautical components such as aircrafts, however, face various problems due to the inherent mobility associated with aircrafts. For example, aircrafts can travel at speeds which allow them to pass through multiple coverage beams of the satellite, and perform dynamic maneuvers that continually change their antenna orientation relative to the satellite. Communication between aircrafts and the satellite is also subject to signal fade resulting from atmospheric conditions such as precipitation. Various regulatory restrictions are also placed on the amount of output power produced by aircraft satellite terminals so as to avoid interference with adjacent satellites. Thus, the signal integrity of the aircraft satellite terminal can vary due factors such as fade, ground station characteristics, regulatory limitations, etc.

In order to compensate for these factors and maintain signal integrity, for example, a constant symbol rate is maintained while varying the modulation and/or coding subject to the terminal's capabilities. The output power of the terminal can also be increased in order to compensate for signal degradation, while conforming to regulatory restrictions. Once the limits of modulation, coding, and output power have been reached, the terminal typically suspends transmission until sufficient conditions change to reestablish communication. If signal degradation results, for example, from rain which covers a significant area in the aircraft's flight path, communication may be unavailable for a prolonged period of time. This can result in significant dissatisfaction for customers subscribing to the service for a fee. Based on the foregoing, there is a need for an approach for improving an aeronautical terminal's ability to maintain communication with a satellite despite factors such as fade and regulatory limitations.

BRIEF SUMMARY

An apparatus and method are disclosed for controlling the power spectral density of aeronautical satellite terminals through adaptive inroute selection, power control, and spreading. According to an embodiment, the apparatus includes at least one processor configured to: send a request from an aircraft to obtain bandwidth with an initial set of transmit parameters; initiate a communication session between the aircraft and at least one satellite using a first set of transmit parameters; monitor aircraft and/or environmental conditions capable of affecting transmit/receive properties during the communication session; determine a maximum allowable transmission output power based, at least in part, on governmental regulations and the monitored aircraft and/or environmental conditions; and adjust one or more transmit parameters from the first set of transmit parameters to maintain aircraft transmission output power below the maximum allowable transmission output power.

According to another embodiment, the method includes sending a request from an aircraft to obtain bandwidth with an initial set of transmit parameters; initiating a communication session between the aircraft and at least one satellite using a first set of transmit parameters; monitoring aircraft and/or environmental conditions capable of affecting transmit/receive properties during the communication session; determining a maximum allowable transmission output power based, at least in part, on governmental regulations and the monitored aircraft and/or environmental conditions; and adjusting one or more transmit parameters from the first set of transmit parameters to maintain aircraft transmission output power below the maximum allowable transmission output power.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5 is a diagram of an extended trajectory table containing entries for exemplary transmit parameters, according to one embodiment;

DETAILED DESCRIPTION

An apparatus and method for controlling the power spectral density of aeronautical satellite terminals through adaptive inroute selection, power control, and spreading are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
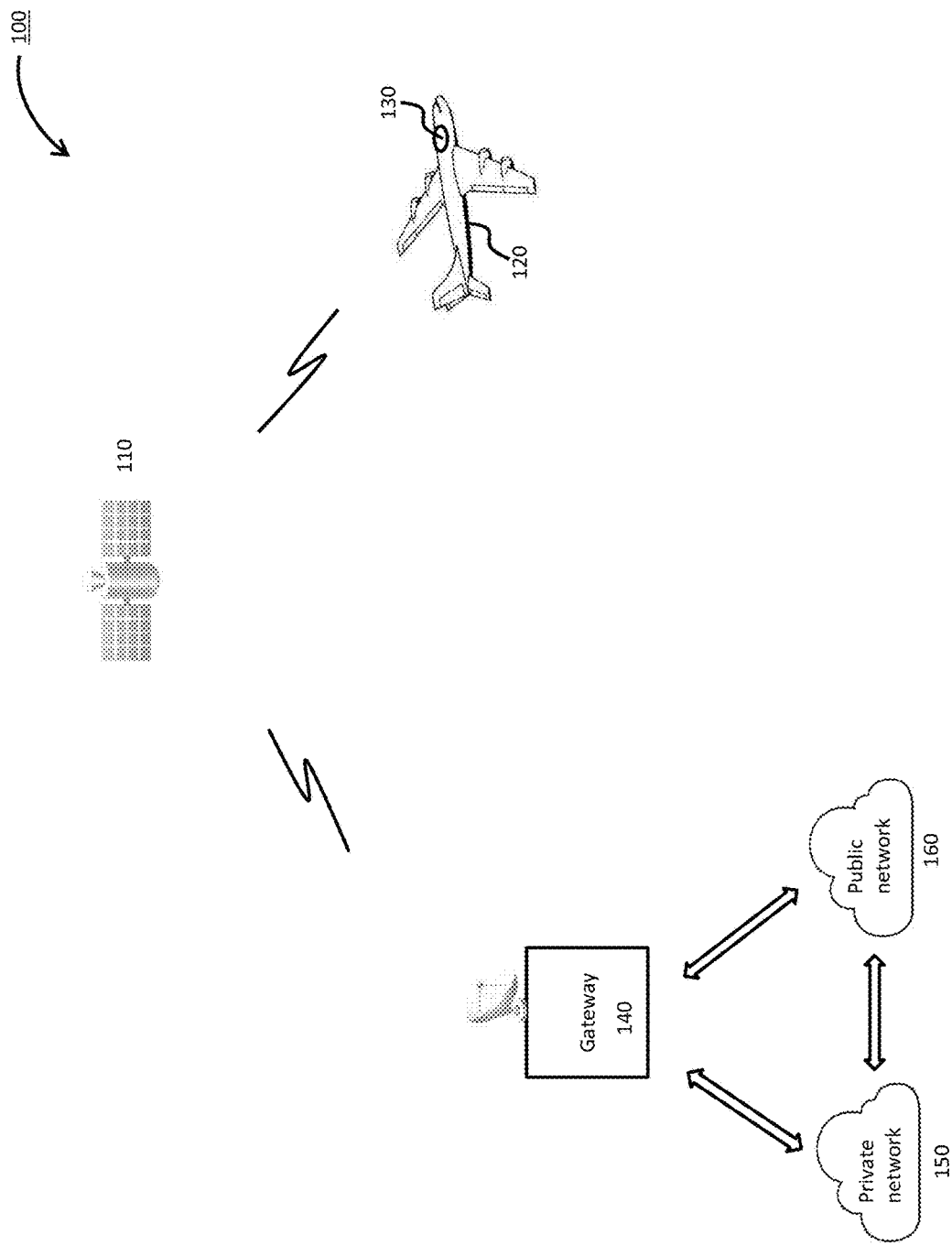
FIG. 1 is a diagram of a system capable of performing power spectral density control, according to one embodiment.

FIG. 1 illustrates an exemplary satellite communication system 100 capable of supporting communication with a mobile platform, such as an aircraft 120, while performing power spectral density control, according to one embodiment. The communication system 100 includes a satellite 110 that supports communications among aircraft 120 and a number of gateways 140 (only one shown). Although not shown in FIG. 1, the gateway 140 can support multiple satellite terminals 120. Additionally, the aircraft 120 includes an aeronautical terminal 130 (or aero terminal), which further connects to passenger equipment (not shown) such as laptop/notebook computers, tablets, mobile phones, etc.

According to various embodiments, the satellite link constitutes a Wide-Area Network (WAN). The gateway 120 can be configured for relaying traffic between a private network 150, and/or a public network such as the Internet 160. The gateway 140 can be further configured to route traffic from the private network 150 and public Internet 160 across the satellite link to the aero terminal 130. The aero terminal 130 then routes the traffic to the appropriate passenger equipment. While FIG. 1 illustrates a single aircraft 120, it should be noted that the satellite communication system 100 is capable of supporting communication with multiple aircrafts simultaneously.

As illustrated in FIG. 1, the satellite communication system 100 facilitates communication between a satellite network, private communication networks 150, and public communication networks 160. Various embodiments, however, can also be configured for providing communication between multiple aircrafts over the satellite network. Thus, while only components such as the aero terminals 130 and gateway 140 are illustrated in FIG. 1, other network components such as, for example, a modem, router, etc., can be incorporated within the system in order facilitate different functionality and/or provide additional features. Accordingly, the communication system 130 illustrated in FIG. 1 is only intended to be illustrative, and in no way restrictive.

Figure 2:
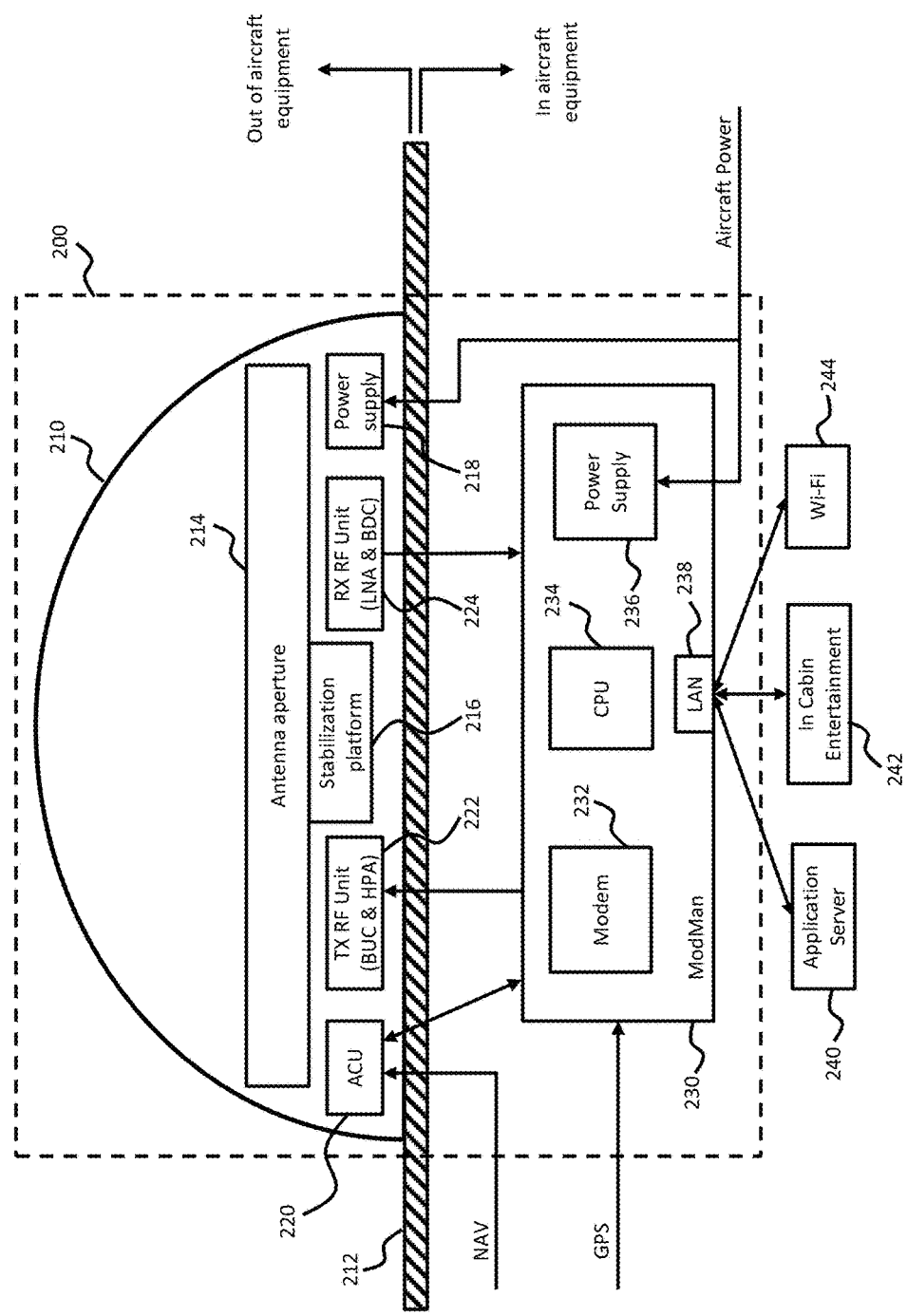
FIG. 2 is a diagram of various components of an aeronautical terminal useable in the system of FIG. 1, according to one embodiment.

FIG. 2 is a diagram of various components of an aeronautical terminal 200 (or aero terminal) useable in the system of FIG. 1, according to one embodiment. The aero terminal 200 includes an enclosure 210 that is mounted on an external surface of the aircraft 212. The enclosure 210 functions to protect various components of the aero terminal 200 from environmental hazards. An antenna aperture 214 is mounted on a stabilization platform 216 within the enclosure 210. According to various embodiments, the stabilization platform 216 can be configured with multiple servo motors (not shown) which provide multiple degrees of freedom to the antenna aperture 214.

According to the illustrated embodiment, the aero terminal 200 includes an antenna control unit (ACU) 220 configured to control various functions of the antenna aperture 214 as well as the stabilization platform 216. For example, the ACU 220 can control the servo motors within the stabilization platform 216 in order to dynamically adjust orientation of the antenna aperture 214. According to at least one embodiment, the ACU 220 can receive navigation information directly from one or more instruments within the aircraft 120. Thus, the antenna aperture 214 can track, or remain continually pointed at, the satellite. The ACU 220 can also perform necessary calculations to compensate for maneuvers, such as banking, while controlling the orientation of the antenna aperture 214.

According to at least one embodiment, the aero terminal 200 can include a transmit radio frequency (RF) unit 222 and a receive RF unit 224 to perform frequency conversion when communicating with the satellite 110. More particularly, the satellite operates within Ka or Ku frequency bands which must be converted to an L band for use by components such as an aero modem manager (ModMan) 230 that is disposed within the aircraft 120. The transmit RF unit 222 can be configured to include, for example, a block upconverter and high power amplifier that upconverts L band frequency signals from the ModMan 230 to Ka/Ku band frequency signals prior to transmission to the satellite 110. The receive RF unit 222 can be configured to include, for example, a downconverter and block low noise amplifier with takes the Ka/Ku band frequency signals received from the satellite 110 and downconverts them to L band frequencies for use by the ModMan 230. While FIG. 2 illustrates components such as the ACU 220, transmit RF unit 222, and receive RF unit 224 within the enclosure 210, it should be noted various embodiments can allow for one or more these components to be disposed within the aircraft 120 and/or the ModMan 230. Thus, the specific arrangement shown in FIG. 2 should only be considered as illustrative, and is in no way intended to be restrictive.

The ModMan 230 can be configured to include, for example, a modem 232, CPU 234, and power supply 236. The modem 232 performs all the functions necessary for modulating and demodulating signal to/from the transmit RF unit 222 and the receive RF unit 224. According to various embodiments, the modem 232 can perform the modulating/demodulating functions independently or under control of the CPU 234. As illustrated in FIG. 2, the ModMan 230 can include one or more local area network (LAN) ports 238 which can be used to interface with passenger equipment as well as various components within the aircraft 120. For example, an application server 240 within the aircraft can be connected to a LAN port 238. An in-cabin entertainment system 242 can also be connected to a LAN port 238 in order to retrieve content that can be available for use by the passengers. A Wi-Fi adapter 244 can be connected to a LAN port 238 in order to provide access to passenger devices. Additionally, the LAN ports 238 can be used to exchange information between the application server 240, in-cabin entertainment system 242, and passenger devices.

Figure 3:
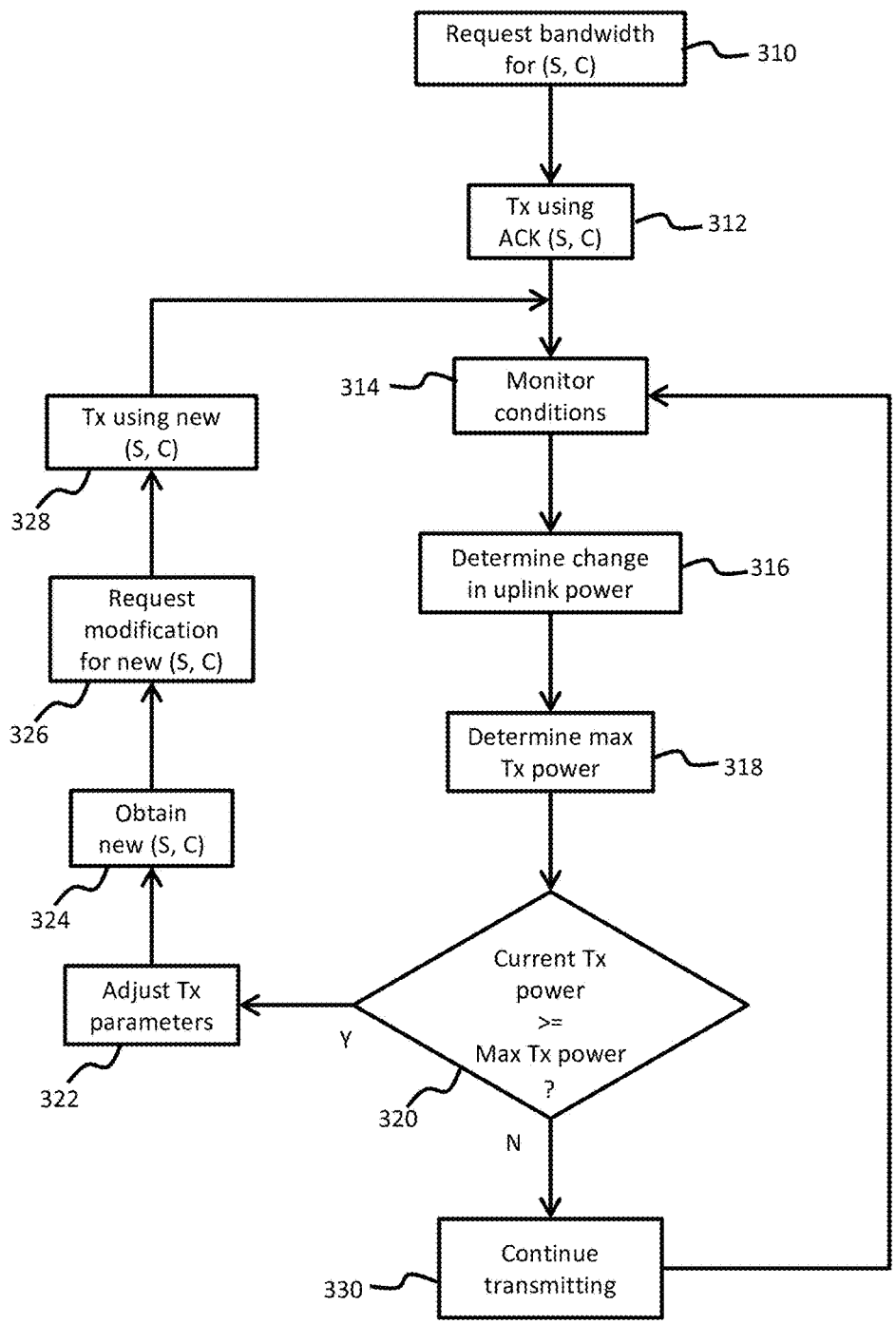
FIG. 3 is a flowchart of a process for power spectral density control, according to one or more embodiments.

FIG. 3 is a flowchart of a process for power spectral density control, according to one or more embodiments. At 310 a request is sent from the aircraft to obtain bandwidth using an initial set of transmit parameters (S,C). Although FIG. 3 illustrates the set transmit parameters as including only two parameters (e.g., a symbol rate and code rate), various embodiments allow for the inclusion of more than 2 parameters. Exemplary transmit parameters include symbol rate, code rate, spread factor, multiplexing type, modulation type, etc. At 312, a new communication session is initiated between the aero terminal and the satellite. According to at least one embodiment, the aero terminal receives an acknowledgment in response to the request for bandwidth. Depending on the implementation, the acknowledgment can further confirm the transmit parameters to be used during the communication session. As will be discussed in greater detail below, it may be necessary to transmit multiple requests for bandwidth prior to receiving an acknowledgment. Thus, the initial set of transmit parameters can sometimes be different from the set of transmit parameters used to initiate the communication session if more than one requests for bandwidth was transmitted before receiving an acknowledgement.

At 314, various conditions that can affect the communication session are monitored. According to at least one embodiment, such conditions can include aircraft flight dynamics and/or environmental conditions. For example, aircraft flight dynamics can include various maneuvers, such as turning or banking, that can affect the allowable power spectral density of transmissions. Environmental conditions can include various conditions capable of degrading the signal to/from the satellite, including rain, clouds, etc. According to various embodiments, the environmental conditions can be inferred from the signal strength feedback. According to other embodiments, the environmental conditions can be obtained from meteorological data received by the aero terminal 200. According to still further embodiments, the aircraft 120 can include equipment configured to detect various environmental conditions. At 318, a maximum transmission output power is determined. The maximum transmission power corresponds to a power level that that does not exceed limits established by regulatory agencies or the limits of the aero terminal's amplifier. According to at least one embodiment, the maximum transmission power can be in the form of the power control word corresponding to the maximum power output ($PCW_{Max}$).

At 320, it is determined whether the current transmission output power is greater than or equal to the maximum transmission output power. If the current transmission output power is greater than the maximum allowable transmission output power, then various adjustments are made to the transmit parameters at 322. The adjustments can be made, for example, to modify various parameters that affect the transmission output power. At 324, a new set of transmit parameters (S,C) is obtained. According to at least one embodiment, the new transmit parameters can be selected such that they facilitate a transmission output power that is lower than the one achieved using the previous set of transmit parameters. According to further embodiments, adjustments can be made to increase the transmission output power if there is a sufficient difference in power from the maximum allowable transmit power. At 326, modification of the bandwidth is requested to continue the communication session using the new set of transmit parameters (S,C). At 328, the communication session continues by transmitting and receiving using the new set of transmit parameters (S,C). Control then returns to 314 where the conditions continue to be monitored.

If it is determined, at 320, that the current transmission output power is not more than the maximum allowable transmission output power, then control passes to 330 where the communication session continues, and the data is transmitted from the aero terminal and the satellite. According to an embodiment, the aircraft and environmental conditions can be continually monitored during the communication session. If any of the conditions change and cause the current transmission output power to exceed the maximum allowable transmission output power, then additional adjustments can be made in order to obtain a new set of transmit parameters that sufficiently reduces the current transmission output power. As can be appreciated, certain communication sessions may continue for prolonged periods, thus requiring continuous monitoring of the aircraft and/or environmental conditions to ensure that the current transmission output power is within allowable constraints.

Figure 4:
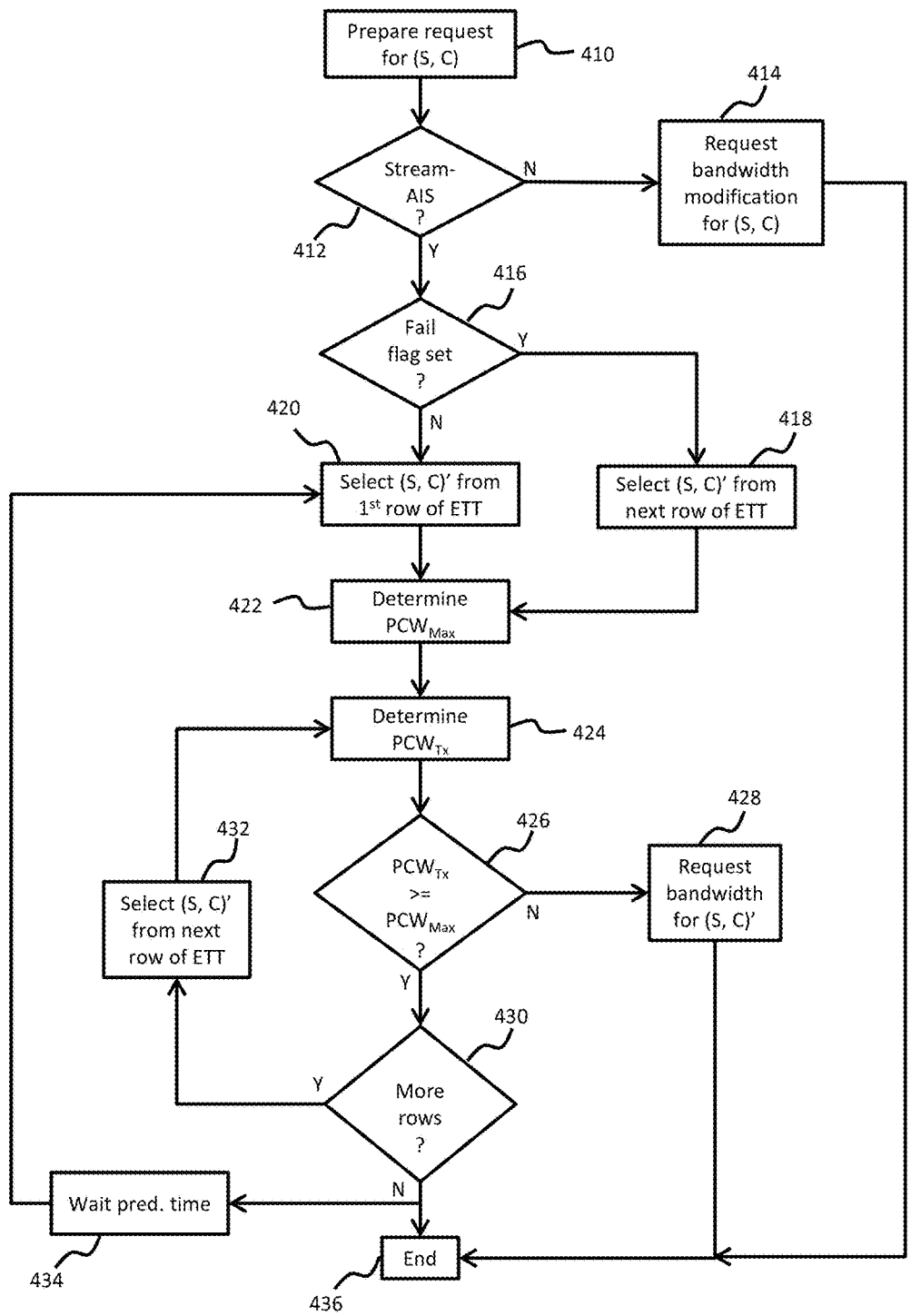
FIG. 4 is a flowchart of a process for requesting bandwidth using power spectral density control, according to at least one embodiment.

FIG. 4 is a flowchart of a process for requesting bandwidth using power spectral density control, according to at least one embodiment. At 410, a request is prepared for an initial set of transmit parameters (S,C). At 412, it is determined whether the request corresponds to a continuation of an established communication session with different transmit parameters. According to one or more embodiments, the aero terminal may be configured to apply adaptive inroute selection (AIS), wherein an optimal symbol rate and code rate for its inroute transmission are selected as a function of a configured trajectory table and information it learns about its transmission from a closed loop power control algorithm. Thus, at 412, it would be determined whether the request corresponds to a continued streaming of data using adaptive in route selection. If the request doesn't correspond to a continuation of the communication session, then at 414, a request is sent for bandwidth modification using the included set of transmit parameters (S,C). At this point, control passes to 436, and the actual communication session continues using the included set of transmit parameters (S,C). The request portion of the communication session will then end, and the communication session continues using the new set of transmit parameters.

If the request corresponds to a continuation of the communication session, then control passes to 416, where it is determined whether a failure flag has been set. The failure flag can be set, for example, when a previous attempt at requesting bandwidth had failed. If the failure flag is set, control passes to 418, where a new set of transmit parameters (S,C)' is selected from the next row of the extended trajectory table. Control then passes to 422. If the failure flag has not been set, control passes to 420. At 420, a new set of transmit parameters (S,C)' is selected from a first row of an extended trajectory table. At 422, the maximum allowable transmission output power $PCW_{Max}$ is determined. As previously discussed, the maximum allowable transmission power $PCW_{Max}$ corresponds to the maximum amount of power that will not exceed regulatory limits or hardware (e.g., power amplifier) limits. At 424, a current transmission output power $PCW_{TX}$ (or TX PCW) is determined for the transmit parameters (S,C)' selected from the first row of the extended trajectory table.

At 426, the current transmission output power is compared to the maximum allowable transmission output power $PCW_{Max}$. If the current transmission output power $PCW_{TX}$ is greater than, or equal to, the maximum allowable transmission output power $PCW_{Max}$, then control passes to 430. A determination is made to see if there are additional rows within the extended trajectory table that may result in a lower transmission output power $PCW_{TX}$. If additional rows exist, a new set of transmit parameters (S,C)' is selected from the next row of the extended trajectory table, at 432. Control then returns to 424. If the current transmission output power $PCW_{TX}$ does not exceed the maximum allowable transmission output power $PCW_{Max}$, then bandwidth is requested for the current set of transmit parameters (S,C)' at 428. The process then ends at 436. Similarly, if there are no additional rows in the extended trajectory table, then the process also ends. According to at least one embodiment, if there are no additional rows in the extended trajectory table, control can optionally pass to 434 where a predetermined and/or random amount of time is allowed to pass. The process is restarted, and control passes to 420 where a new set of transmit parameters is selected from the first entry in the extended trajectory table.

FIG. 5 is a diagram of an extended trajectory table containing entries for exemplary transmit parameters, according to one embodiment. The extended trajectory table 500 contains an index column 510, which is used to reference (or identify) different rows (or entries). According to the illustrated embodiment, the extended trajectory table 500 includes a number of columns that correspond to different parameters which can be used as transmit parameters, according to various embodiments. For example, the extended trajectory table 500 includes a spread factor column 512, a multiplexing type column 514, a modulation type column 516, a symbol rate column 518, a code rate column 520, a minimum energy per symbol to noise power spectral density ratio ($E_s/N_o$) column 522, a target ($E_s/N_o$) column 524, a carrier power to noise power spectral density ratio ($C/N_o$) column 526, and a PSD column 528. According to at least one embodiment, the extended trajectory table 500 can be organized such that the least robust combination of transmit parameters occupies the first row, and the most robust combination of transmit parameters occupies the last row. According to further embodiments, the extended trajectory table 500 can be stored in a memory or storage unit of the aero terminal 200. Values for the extended trajectory table 500 can also be transmitted and/or transferred to the aero terminal 200 and appropriately stored prior to operation. For example, the values can be transferred from removable storage media or transmitted from an external source.

Figure 6:
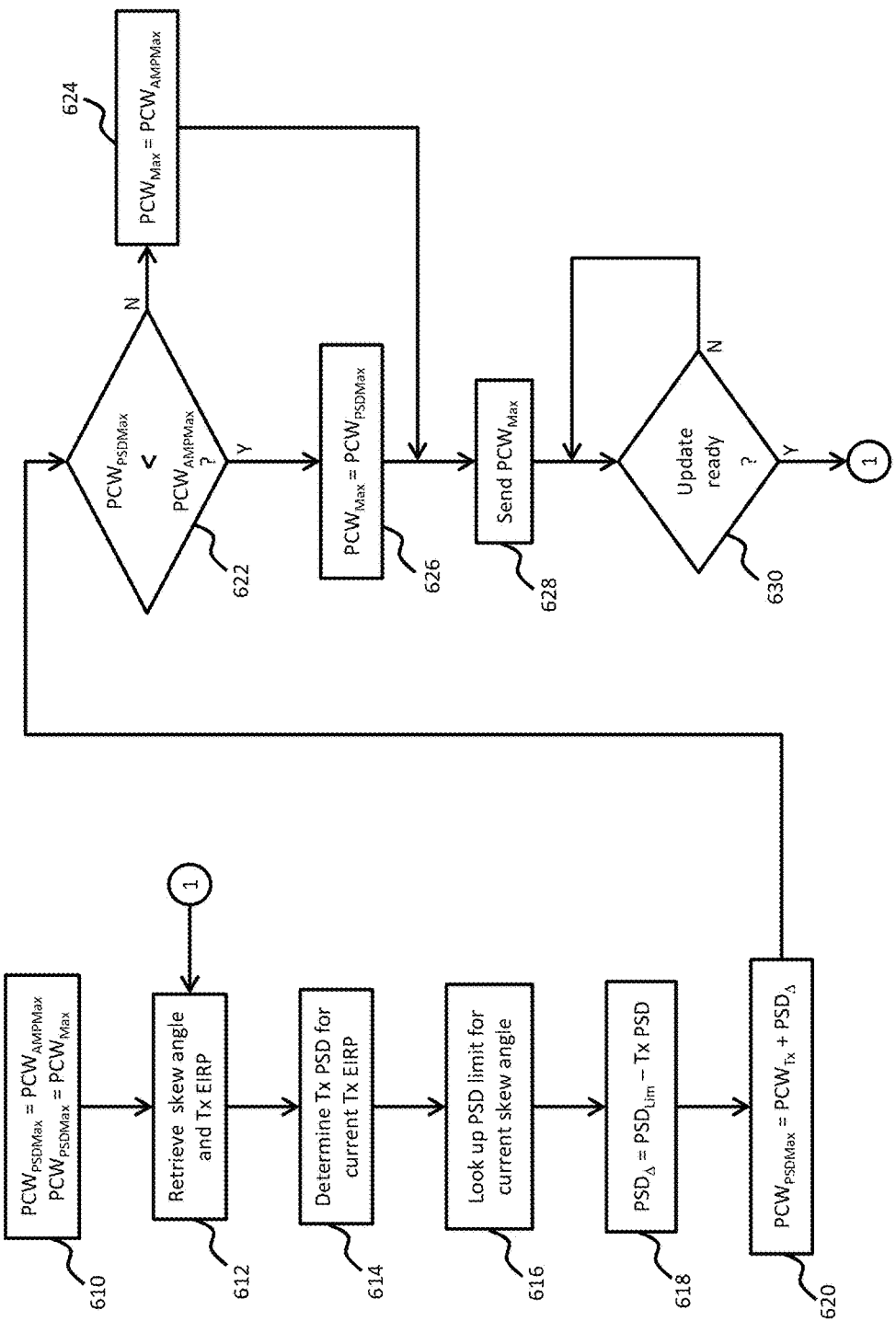
FIG. 6 is a flowchart of a process for determining a maximum transmission output power, according to one or more embodiments.

FIG. 6 is a flowchart of a process for determining a maximum transmission output power, according to one or more embodiments. At 610, the transmission output power corresponding to the maximum power spectral density $PCW_{PSDMax}$ is set equal to the transmission output power corresponding to the maximum power of the amplifier $PCW_{AMPMax}$ $PCW_{Max}$ is also set to the same value. At 612, a skew angle and transmit equivalent isotropically radiated power (EIRP) are retrieved. According to at least one embodiment, the values for skew angle and transmit EIRP are obtained from the antenna control unit. At 614, a transmit power spectral density (Tx PSD) is determined for the current transmit EIRP and symbol rate. At 616, the PSD limit for the current skew angle is determined. According to at least one embodiment, a table which lists different PSD limits corresponding to different skew angles of the antenna can be provided by the antenna manufacturer. Additionally, values for the table can be stored in a memory or storage unit of the aero terminal.

At 618, the difference between the PSD limit and the current transmit PSD is determined. At 620, the transmission output power corresponding to the maximum power spectral density $PCW_{PSDMax}$ is set equal to the current transmission output power $PCW_{TX}$ plus the calculated difference. At 622, the transmission output power corresponding to the maximum power spectral density $PCW_{PSDMax}$ is compared to the transmission output power corresponding to the maximum output achievable by the amplifier $PCW_{AMPMax}$. If $PCW_{AMPMax}$ is greater, then maximum allowable transmission output power $PCW_{Max}$ is set equal to $PCW_{PSDMax}$ at 626. Alternatively, the maximum transmission output power $PCW_{Max}$ is set equal to the maximum power achievable by the amplifier $PCW_{AMPMax}$ at 624. The current maximum allowable transmission output power $PCW_{Max}$ is returned at 628.

At 630, it is determined whether a new update is ready. The update corresponds to new values for the skew angle and transmit EIRP obtainable from the antenna control unit. According to at least one embodiment, updates are provided every interval corresponding to a frame length. According to still further embodiments, the frame length can be set to 45 msec and updates can be retrieved every 45 msec. If updates are ready, then control jumps to 612 where new values for the skew angle and transmit EIRP are retrieved. If updates are not ready, however, control returns to 630 such that continues checks are performed until an update is ready.

Figure 7:
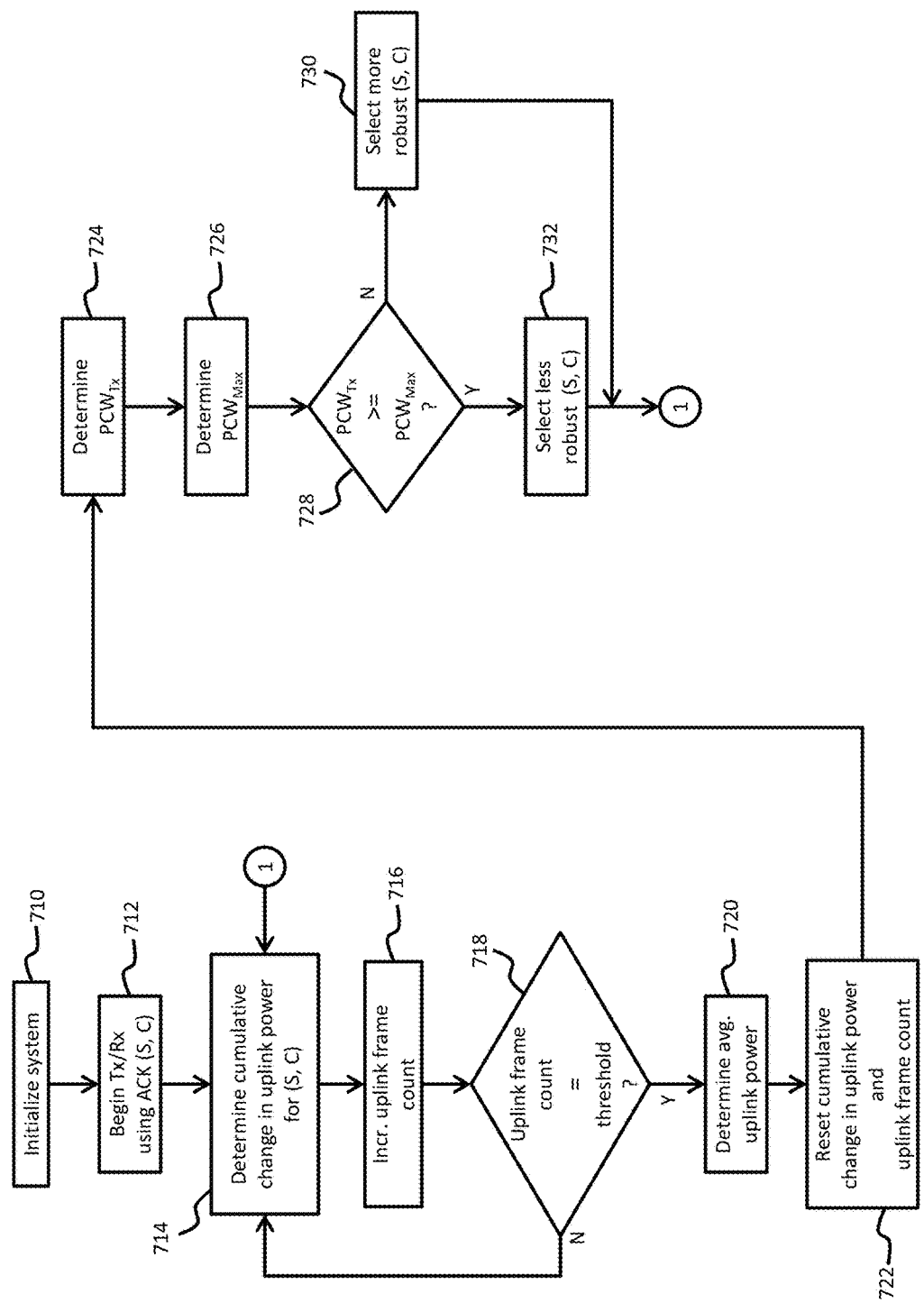
FIG. 7 is a flowchart of a process for applying adaptive inroute selection to control power spectral density while communicating, according to at least one embodiment.

FIG. 7 is a flowchart of a process for applying adaptive inroute selection to control power spectral density while communicating, according to at least one embodiment. At 710, the system (i.e., the aero terminal) is initialized. According to various embodiments, initialization of the system can include ranging the aero terminal for various properties of components such as, for example, the modem as well as output power capabilities of the amplifier. At 712, the communication session is initiated. As previously discussed, prior to initiating the communication session, bandwidth has already been allocated for the communication session using the acknowledged set of transmit parameters (S,C) in accordance with the embodiment shown, for example, in FIG. 4. Thus, at 712, the communication session is initiated by transmitting and receiving data using the initial set of transmit parameters (S,C) that were acknowledged through the request.

At 714, the cumulative change in uplink power for the initial set of transmit parameters (S,C) is determined. According to at least one embodiment, the cumulative change in uplink power can be calculated based on the symbol rate, code rate, etc. that are supplied as part of the initial set of transmit parameters. At 716, the uplink frame count is incremented. At 718, a determination is made to see if the uplink frame count has reached a predetermined threshold. If the threshold has not been reached, then control returns to 714 where the cumulative change in uplink power is again determined to account for the next transmit frame. If the uplink frame count has reached the threshold, however, the average uplink power is determined at 720. At 722, the cumulative change in uplink power and uplink frame count are reset. At 724, the transmission output power $PCW_{TX}$ for the current transmission is determined. At 726, the maximum allowable transmission output power is determined $PCW_{Max}$. As previously discussed, at least one embodiment allows for the maximum allowable transmission output power $PCW_{Max}$ to be determined in accordance with the process outlined in FIG. 6.

At 728, the transmission output power for the current transmission $PCW_{TX}$ is compared to the maximum allowable transmission output power $PCW_{Max}$. If the output power of the current transmission $PCW_{TX}$ is greater than or equal to the maximum allowable transmission output power $PCW_{Max}$, then a less robust set of transmit parameters (S,C) is selected at 732. If the output power of the current transmission $PCW_{TX}$ is not greater than the maximum allowable transmission output power $PCW_{Max}$, then a more robust set of transmit parameters (S,C) is selected at 730. According to at least one embodiment, a selection of a less robust set of transmit parameters can be based, at least in part, on selection of a previous row within the extended trajectory table. As previously discussed, the extended trajectory table can be configured such that the least robust set of input parameters is stored as the first entry, while the most robust set of transmit parameters is stored as the last entry. Additionally, the most robust set of transmit parameters results in the lowest transmission output power, while the least robust set of transmit parameters results in the highest transmission output power. Thus, by selecting a less robust set of transmit signals, the output power of the amplifier can be raised, while also increasing the amount of data being transmitted. Control then returns to 714 in order to continue monitoring the cumulative change in uplink power for the newly selected (S,C)' parameters.

Figure 8:
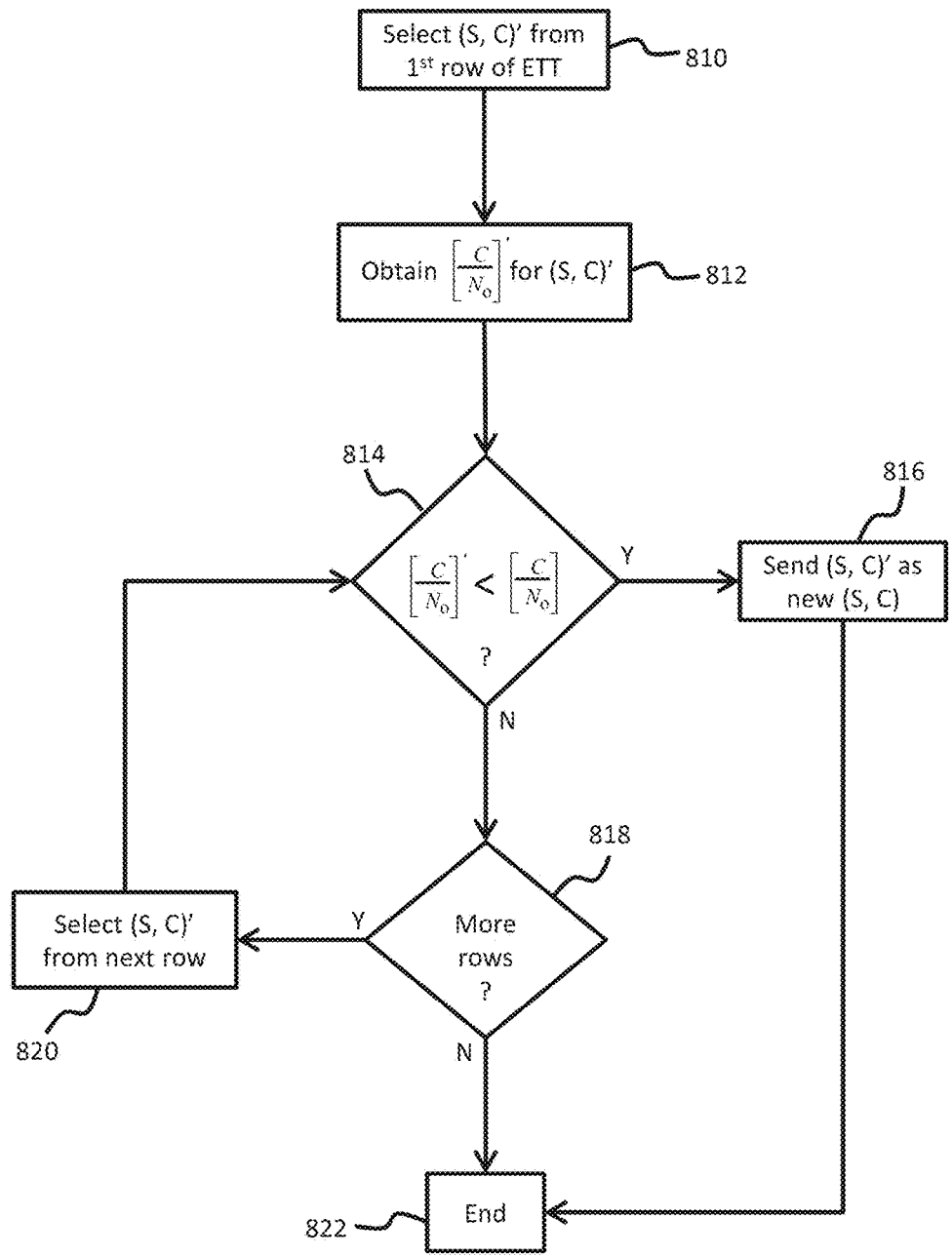
FIG. 8 is a flowchart of a process for selecting a more robust set of transmit parameters, according to one or more embodiments.

FIG. 8 is a flowchart of a process for selecting a more robust set of transmit parameters, according to one or more embodiments. At 810, a first (or current) set of transmit parameters (S,C)' is selected from the first row of the extended trajectory table. At 812, the carrier power to noise power spectral density ratio $[C/N_o]$' corresponding to the first set of transmit parameters (S,C)' is determined. At 814, the carrier power to noise power spectral density ratio $[C/N_o]$' for the current set of transmit parameters (S,C)' is compared to the $[C/N_o]$' of the previous set of transmit parameters (S,C). If the newly determined carrier power to noise power spectral density ratio $[C/N_o]$' is less than the previous carrier power to noise power spectral density ratio $[C/N_o]$, then the first (or current) set of transmit parameters (S,C) is returned as the new transmit parameters (S,C) to be used in order to reduce the transmission output power at 816. The process would then end at 822.

Alternatively, if the newly determined carrier power to noise power spectral density ratio $[C/N_o]$' is not less than the previous carrier power to noise power spectral density ratio $[C/N_o]$', a check is performed at 818 to see if the extended trajectory table contains any additional rows. If additional rows are available, then the next row of the extended trajectory table is selected at 820 in order to obtain new values for use as the current set of transmit parameters (S,C). Control then returns to 814. If no additional rows are present within the extended trajectory table, at 818, then the process also ends at 822.

Figure 9:
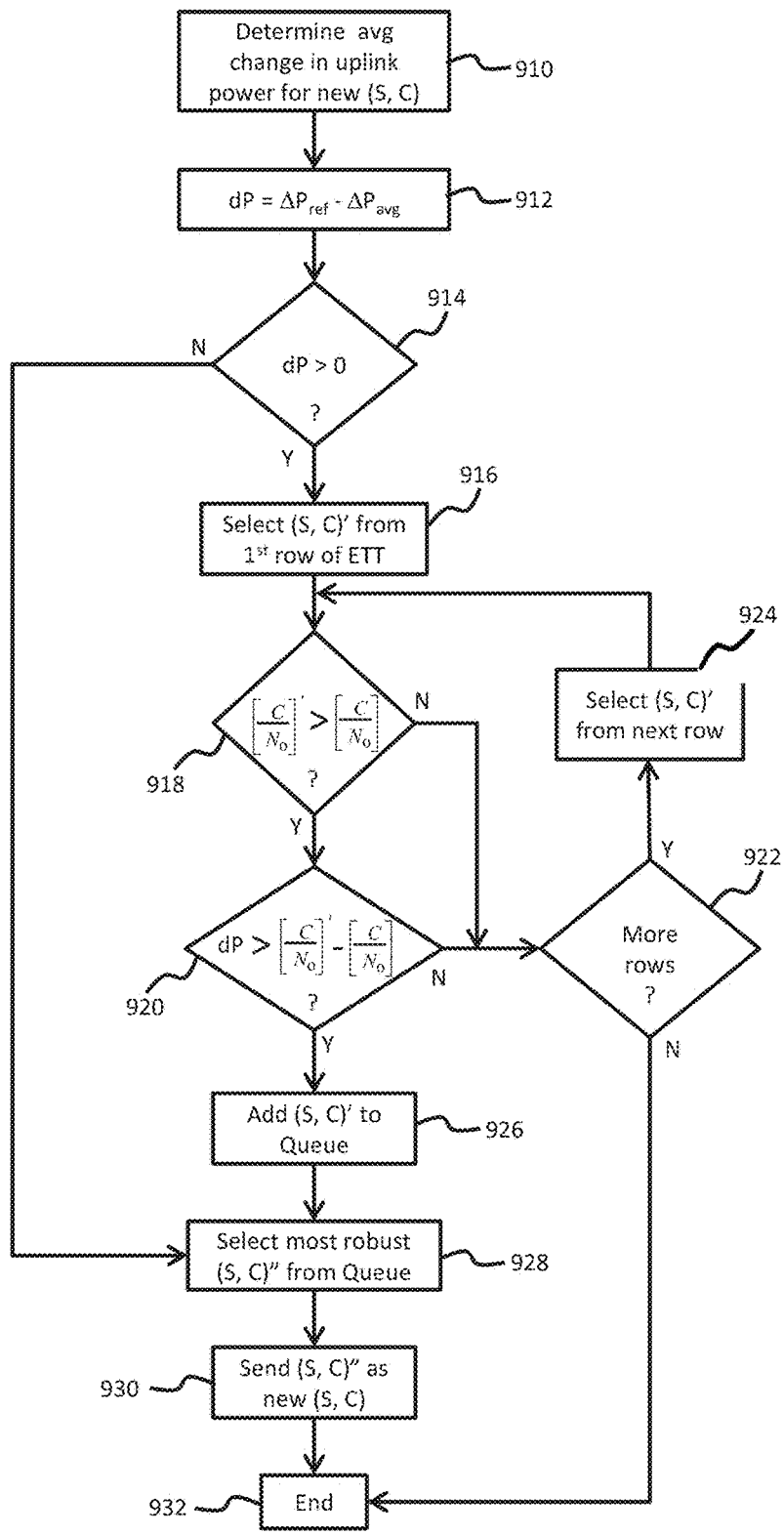
FIG. 9 is a flowchart of a process for selecting a less robust set of transmit parameters, according to one or more embodiments.

FIG. 9 is a flowchart of a process for selecting a less robust set of transmit parameters, according to one or more embodiments. At 910, the average change in uplink power for a newly transitioned set of transmit parameters (S,C) is determined. This corresponds to the set of transmit parameters used to request bandwidth modification as part of the aero terminal's AIS capabilities. At 912, the average change in power dP is determined. According to at least one embodiment, the average change in power dP can be determined by subtracting the average change in uplink power for the new set of transmit symbols $\Delta P_{ref}$ from the average change in uplink power prior to changing to the new set of transmit symbols $\Delta P_{avg}$.

At 914, it is determined if the change in power is greater than zero. If the change in power is not greater than zero, then control passes to 928. If the change in power, however, is greater than zero, then control passes to 916. The next set of transmit parameters (S,C)' is selected from the first row of the extended trajectory table. At 918, the current carrier power to noise power spectral density ratio $[C/N_o]$' is calculated for the current set of transmit parameters (S,C)' and compared to the carrier power to noise power spectral density ratio $[C/N_o]$ for the previous set of transmit parameters (S,C).

If the new carrier power to noise power spectral density ratio $[C/N_o]$' is greater than the previous carrier power to noise power spectral density ratio $[C/N_o]$, then control passes to 920. If the new carrier power to noise power spectral density ratio $[C/N_o]$' is less, then control passes to 922, where it is determined if the extended trajectory table contains any additional rows. If no additional rows are present, then the process ends at 932. If additional rows are present, however, then new values for the current set of transmit parameters (S,C) are selected from the next row of the extended trajectory table at 924. Control then returns to 918.

At 920, the cumulative change in uplink power dP is compared to the difference between $[C/N_o]$' and $[C/N_o]$. If the cumulative change in uplink power dP is not greater than the difference, then control passes to 922, where the extended trajectory table is examined to determine if additional rows are available. Alternatively, if the cumulative change in uplink power dP is greater than the difference between $[C/N_o]$' and $[C/N_o]$, then the next set of transmit parameters (S,C)' is added to a queue. At 928, the queue is examined in order to identify the most robust set of transmit parameters (S,C)" stored therein. At 930, the most robust set of transmit parameters (S,C)" from the queue is returned as the new set of transmit parameters (S,C). The process then ends at 932.

Figure 10:
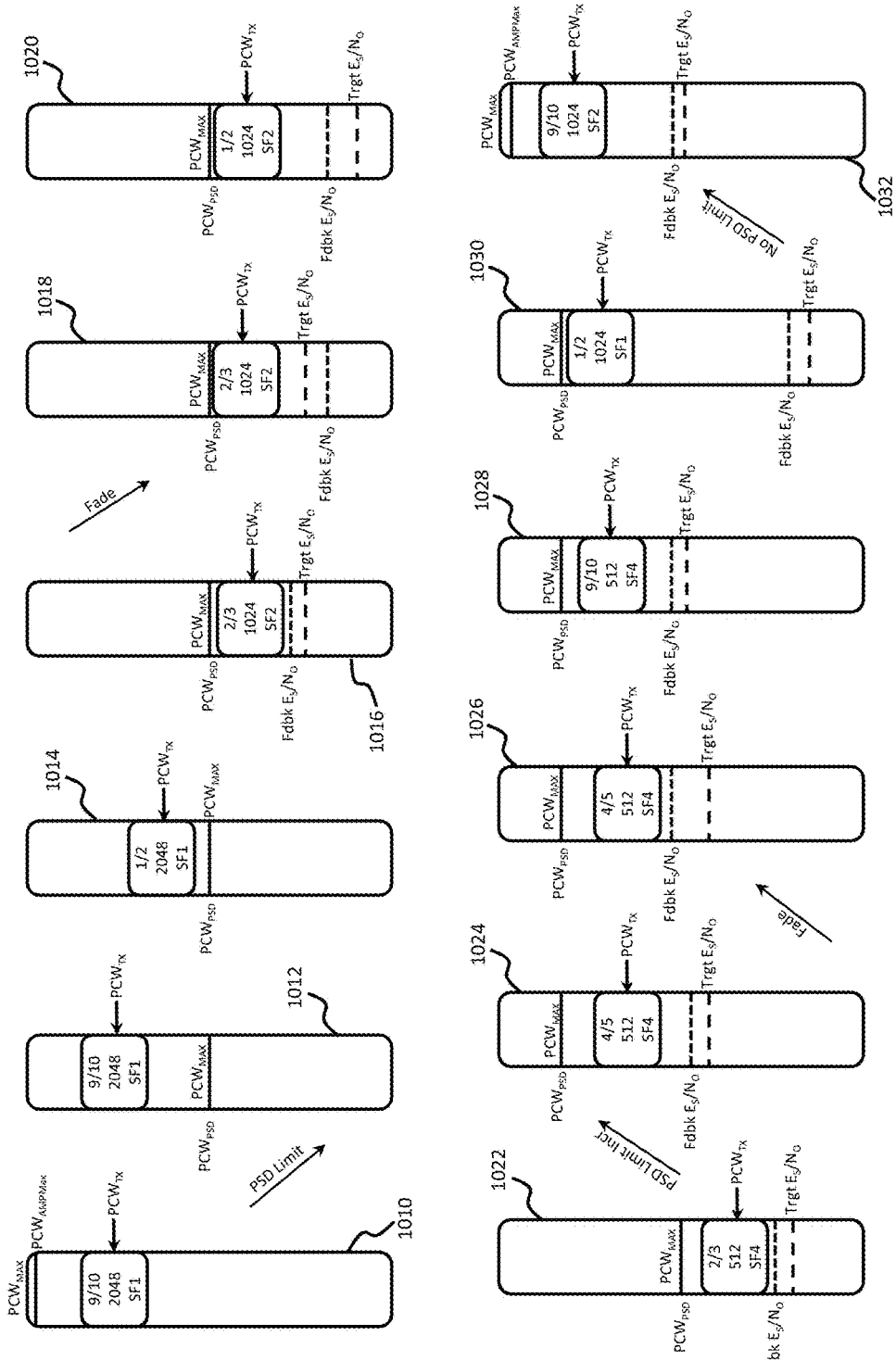
FIG. 10 is a diagram illustrating exemplary use of power spectral density control to maintain communication under varying conditions, according to one embodiment.

FIG. 10 is a diagram illustrating exemplary use of power spectral density control to maintain communication under varying conditions, according to one embodiment. At 1010, the aircraft may be engaged in normal flight with no regulatory restrictions, or interference that can affect the quality of the signal. Thus, no limits have been placed on the power spectral density (PSD). Additionally, the maximum allowable transmission power $PCW_{Max}$ is the same as the maximum output power for the amplifier $PCW_{AMPMax}$. The aero terminal has established a communication session and is currently transmitting with initial set of transmit parameters. Referring additionally to FIG. 5, the initial set of transmit parameters corresponds to the first entry of the extended trajectory table. More particularly, the aero terminal is communicating using a symbol rate of 2048 and a code rate of 9/10. Additionally, a spread factor of 1 has been applied. Thus, the transmission output power $PCW_{TX}$ of the aero terminal is determined based on the initial set of transmit parameters.

As illustrated in FIG. 10, although the least robust set of transmit parameters is currently in use, the transmission output power $PCW_{TX}$ of the aero terminal is still well below the maximum allowable transmission output power $PCW_{Max}$ as well as the maximum transmission output power of the amplifier $PCW_{AMPMax}$. At 1012, a PSD limit is imposed. This can correspond, for example, to a situation where the aircraft has reached a position that is subject to regulatory power limitations. The new PSD limit causes the maximum allowable transmission output $PCW_{Max}$, power to be reduced. At this point, the current transmission output power $PCW_{TX}$ is greater than the maximum allowable transmission output power $PCW_{Max}$. At 1014, the next row of the extended trajectory table is used in order to select a more robust set of transmit parameters capable of reducing the transmission output power $PCW_{TX}$ of the aero terminal for compliance with the PSD limit.

According to the illustrated embodiment, the next row selected from the extended trajectory table contains a code rate of 1/2, a symbol rate of 2048, and a spread factor of 1. This corresponds to index 4 in the exemplary trajectory table shown in FIG. 5. As illustrated in FIG. 10, the new set of transmit parameters results in a transmission output power $PCW_{TX}$ which remains above the maximum allowable transmission output power $PCW_{Max}$. Thus, a subsequent row within the extended trajectory table is selected in order to obtain a more robust set of transmit parameters. At 1016, a new inroute group with a lower symbol rate is assigned. The aero terminal selects an entry whose transmit parameters include a code rate of 2/3, a symbol rate of 1024, and a spread factor of 2. This corresponds to entry 10 in FIG. 5. The new set of transmit parameters results in a transmission output power $PCW_{TX}$ that is below the maximum allowable transmission output power.

As further shown at 1016, a target energy per symbol to noise power spectral density $(E_s/N_o)$ has been determined to be below the feedback $(E_s/N_o)$. At this point, the aircraft encounters, for example, an environmental condition such as rain which results in signal fade, the feedback $(E_s/N_o)$ has decreased below the target $(E_s/N_o)$ at 1018. A more robust set of transmit parameters is selected at 1020 in order to decrease the target $(E_s/N_o)$ and combat the fade being experienced. The new set of transmit parameters include a code rate of 1/2, a symbol rate of 1024, and a spread factor of 2.

At 1022, a new inroute group is assigned at a lower symbol rate. The aero terminal subsequently selects an entry in the extended trajectory table which contains an appropriate code rate and spread factor that maintains the transmission output power $PCW_{TX}$ below the maximum allowable transmission output power $PCW_{Max}$. At 1024, the PSD limit is raised. The aero terminal selects a less robust set of transmit parameters and increases the output power to meet the requirements of the table entry. The new set of transmit parameters includes a code rate of 4/5, a symbol rate of 512, and a spread factor of 4.

At 1026, the fade which was previously being experience, has been eliminated. The aero terminal is now overpowered because the fade condition has been removed. At 1028, a less robust set of transmit parameters is selected in order to increase the power and code rate. The new set of transmit parameters includes a code rate of 9/10, a symbol rate of 512, and a spread factor of 4. At 1030, a new inroute group is assigned at a higher symbol rate of 1024. The aero terminal selects an entry within the extended trajectory table which provides a code rate of 1/2 and spread factor of one to match the new symbol rate. At 1032, the PSD limit is eliminated. This allows the aero terminal to select a set of transmit parameters that will increase the power as well as the code rate. The new set of transmit parameters includes a code rate of 9/10, a symbol rate of 1024, and a spread factor of 2.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
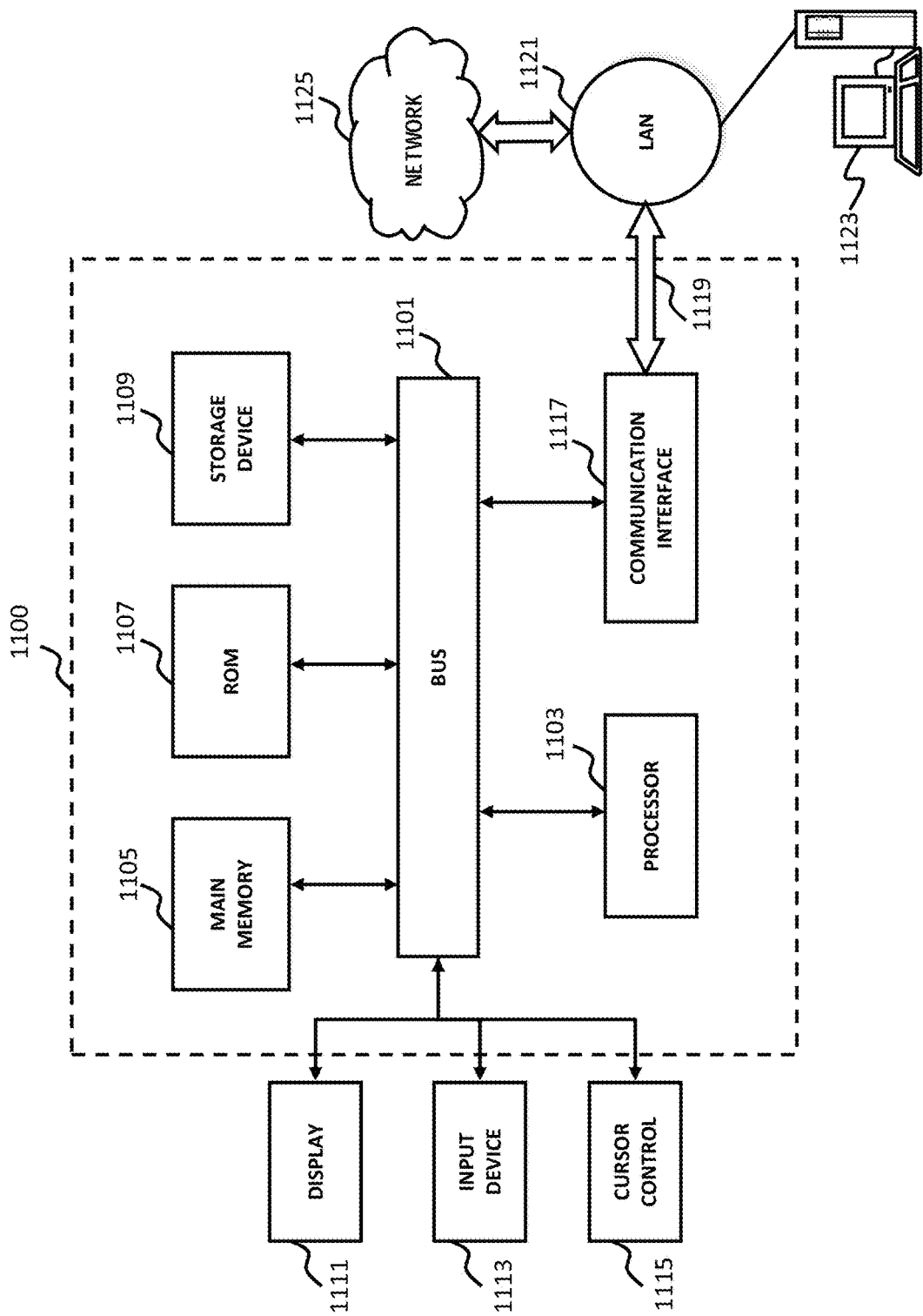
FIG. 11 is a diagram of a computer system that can be used to implement various exemplary embodiments.

FIG. 11 is a diagram of a computer system that can be used to implement various embodiments. The computer system 1100 includes a bus 1101 or other communication mechanism for communicating information and a processor 1103 coupled to the bus 1101 for processing information. The computer system 1100 also includes main memory 1105, such as a random access memory (RAM) or other dynamic storage device, coupled to the bus 1101 for storing information and instructions to be executed by the processor 1103. Main memory 1105 can also be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a light emitting diode (LED) or other flat panel displays, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111. Additionally, the display 1111 can be touch enabled (i.e., capacitive or resistive) in order facilitate user input via touch or gestures.

According to an exemplary embodiment, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement exemplary embodiments. Thus, exemplary embodiments are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, or any other communication interface to provide a data communication connection to a corresponding type of communication line. As another example, communication interface 1117 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a High Definition Multimedia Interface (HDMI), etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 such as a wide area network (WAN) or the Internet. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an exemplary embodiment through the network 1125, the local network 1121 and the communication interface 1117. The processor 1103 may execute the transmitted code while being received and/or store the code in the storage device 1109, or other non-volatile storage for later execution. In this manner, the computer system 1000 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical or magnetic disks, such as the storage device 1109. Non-volatile media can further include flash drives, USB drives, microSD cards, etc. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 12:
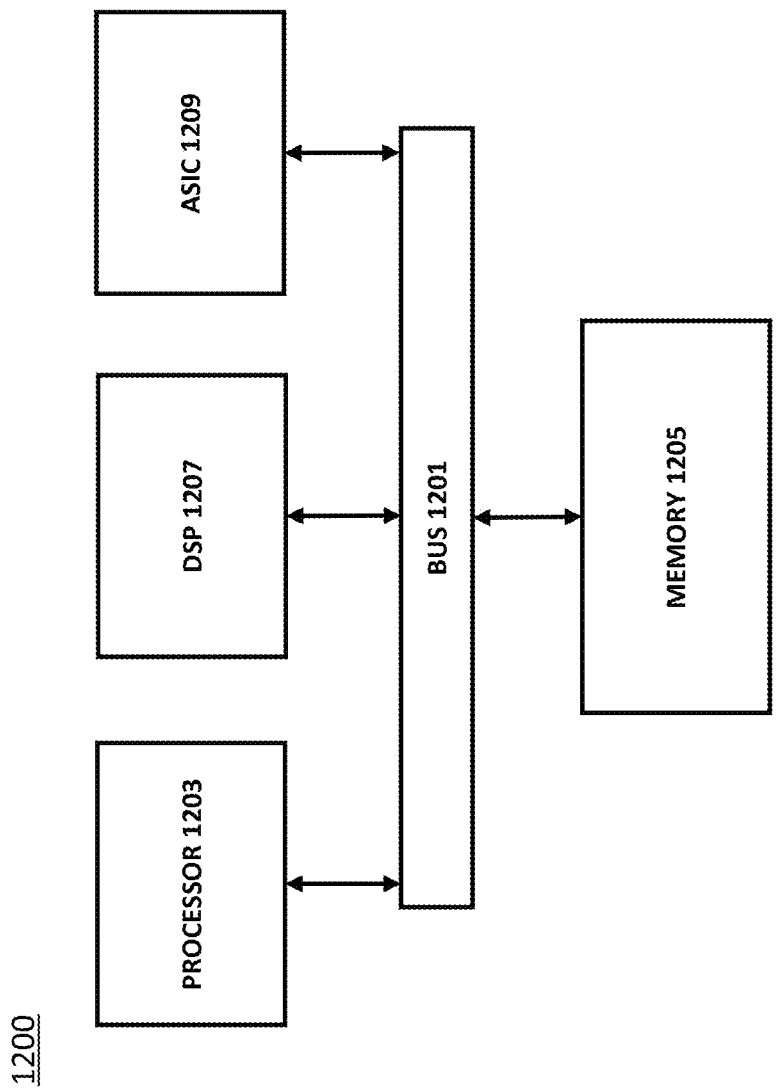
FIG. 12 is a diagram of a chip set that can be used to implement various exemplary embodiments.

FIG. 12 illustrates a chip set 1200 upon which an embodiment of the invention may be implemented. Chip set 1200 is programmed to implement various features as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of the figures.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 1205 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
sending a request from an aircraft to obtain bandwidth with an initial set of transmit parameters;
initiating a communication session between the aircraft and at least one satellite using a first set of transmit parameters;
monitoring aircraft and/or environmental conditions capable of affecting transmit/receive properties during the communication session;
determining a change in uplink power at a time interval equal to a transmit frame length;
determining a maximum allowable transmission output power based, at least in part, on governmental regulations and the monitored aircraft and/or environmental conditions; and
adjusting one or more transmit parameters from the first set of transmit parameters during the time interval to maintain aircraft transmission output power below the maximum allowable transmission output power.

2. The method of claim 1, wherein the initiating comprises:
modifying the initial set of transmit parameters based, at least in part, on a response to the request,
wherein the first set of transmit parameters corresponds to the modified initial set of transmit parameters.

3. The method of claim 1, wherein the environmental conditions are determined based on at least one of meteorological data received from the at least one satellite and estimated meteorological data based on the signal received from the at least one satellite.

4. The method of claim 1, wherein the environmental conditions are determined based, at least in part, on data received from at least one sensor included in the aircraft.

5. The method of claim 1, wherein:
the aircraft and/or environmental conditions are updated at the time interval equal to a transmit frame length; and
the maximum allowable transmission output power is determined at the time interval equal to a transmit frame length.

6. The method of claim 1, wherein adjusting one or more transmit parameters comprises:
adjusting at least one of a symbol rate, code rate, spread factor, and modulation type to obtain a new set of transmit parameters;
comparing a required transmission output power using the new set of transmit parameters to the maximum allowable transmission output power; and
repeating the adjusting and comparing until the required transmission output power is within a predetermined range below the maximum allowable transmission output power.

7. The method of claim 1, wherein:
each set of transmit parameters is stored as a different entry in a table containing a plurality of entries; and
adjusting one or more transmit parameters comprises selecting a next or previous entry in the table.

8. The method of claim 1, wherein determining a maximum allowable transmission output power comprises:
determining a current transmit power spectral density (PSD) based, at least in part, on the aircraft conditions and a transmit equivalent isotropically radiated power (EIRP);
determining a maximum PSD based on the current transmission output power, the current transmit PSD, and PSD limit for the aircraft conditions; and
setting the maximum allowable transmission output power equal to an output power level corresponding to the maximum allowable PSD if the output power corresponding to the maximum allowable PSD is less than the maximum output power of the amplifier, otherwise setting the maximum allowable transmission output power equal to the maximum output power of the amplifier.

9. The method of claim 8, wherein:
determining a current transmit PSD further comprises receiving a skew angle and the transmit EIRP; and
determining a maximum PSD further comprises retrieving the PSD limit based, at least in part, on the received skew angle.

10. The method of claim 9, further comprising adjusting the received transmit EIRP based, at least in part, on the monitored environmental conditions.

11. An apparatus comprising:
at least one processor configured to:
send a request from an aircraft to obtain bandwidth with an initial set of transmit parameters;
initiate a communication session between the aircraft and at least one satellite using a first set of transmit parameters;
monitor aircraft and/or environmental conditions capable of affecting transmit/receive properties during the communication session;
determine a change in uplink power at a time interval equal to a transmit frame length;
determine a maximum allowable transmission output power based, at least in part, on governmental regulations and the monitored aircraft and/or environmental conditions; and
adjust one or more transmit parameters from the first set of transmit parameters during the time interval to maintain aircraft transmission output power below the maximum allowable transmission output power.

12. The apparatus of claim 11, wherein the at least one processor is further configured to:
modify the initial set of transmit parameters based, at least in part, on a response to the request,
wherein the first set of transmit parameters corresponds to the modified initial set of transmit parameters.

13. The apparatus of claim 11, wherein the at least one processor is configured to determine the environmental conditions based on at least one of meteorological data received from the at least one satellite and estimated meteorological data based on the signal received from the at least one satellite.

14. The apparatus of claim 11, further comprising:
at least one sensor included in the aircraft for collecting environmental data,
wherein the at least one processor is configured to determine the environmental conditions based, at least in part, on the collected environmental data.

15. The apparatus of claim 11, wherein the at least one processor is further configured to:
update the aircraft and/or environmental conditions at the time interval equal to a transmit frame length; and
determine the maximum allowable transmission output power at the time interval equal to a transmit frame length.

16. The apparatus of claim 11, wherein the at least one processor is further configured to adjust the one or more transmit parameters by:
adjusting at least one of a symbol rate, code rate, spread factor, and modulation type to obtain a new set of transmit parameters;
comparing a required transmission output power using the new set of transmit parameters to the maximum allowable transmission output power; and
repeating the adjusting and comparing until the required transmission output power is within a predetermined range below the maximum allowable transmission output power.

17. The apparatus of claim 11, wherein the at least one processor is further configured to:
access a table containing a plurality of entries, each entry corresponding to a different set of transmit parameters; and
adjust the one or more transmit parameters by selecting a next or previous entry in the table.

18. The apparatus of claim 11, wherein the at least one processor is further configured to determine a maximum allowable transmission output power by:

determining a current transmit power spectral density (PSD) based, at least in part, on the aircraft conditions and a transmit equivalent isotropically radiated power (EIRP);

determining a maximum PSD based on the current transmission output power, the current transmit PSD, and PSD limit for the aircraft conditions; and setting the maximum allowable transmission output power equal to an output power level corresponding to the maximum allowable PSD if the output power corresponding to the maximum allowable PSD is less than the maximum output power of the amplifier, otherwise setting the maximum allowable transmission output power equal to the maximum output power of the amplifier.

19. The apparatus of claim 18, wherein:

determining a current transmit PSD further comprises receiving a skew angle and the transmit EIRP; and determining a maximum PSD further comprises retrieving the PSD limit based, at least in part, on the received skew angle.

20. The apparatus of claim 19, wherein the at least one processor is further configured to adjust the received transmit EIRP based, at least in part, on the monitored environmental conditions.

* * * * *